United States Patent [19]

Braddock

[11] Patent Number: 5,027,991

[45] Date of Patent: Jul. 2, 1991

[54] TRAILER TIRE RACK

[76] Inventor: Alan Braddock, 1229 N. Jefferson, Mt. Pleasant, Tex. 75455

[21] Appl. No.: 362,666

[22] Filed: Jun. 7, 1989

Related U.S. Application Data

[63] Continuation of Ser. No. 94,585, Sep. 9, 1987, abandoned.

[51] Int. Cl.⁵ ............................................. B62D 43/04
[52] U.S. Cl. .............................. 224/42.23; 224/42.21
[58] Field of Search ................. 224/42.03 R, 42.03 A, 224/42.06, 42.21, 42.12, 42.23, 42.07, 42.08; 414/462, 463, 464, 465, 466; 296/37.2, 37.6

[56] References Cited

U.S. PATENT DOCUMENTS

| | | | |
|---|---|---|---|
| 1,813,094 | 7/1931 | Appel | 224/42.23 |
| 2,449,544 | 9/1948 | Ballard | |
| 2,631,764 | 3/1953 | Brown | |
| 3,735,883 | 5/1973 | Hrivnyak | 414/466 |
| 3,862,696 | 1/1975 | McCauley et al. | |
| 4,047,629 | 9/1977 | Klein | |
| 4,060,171 | 11/1977 | Ludwig | 224/42.23 |
| 4,095,709 | 6/1978 | Eller | 224/42.23 |
| 4,174,797 | 11/1979 | Yasue et al. | |
| 4,238,091 | 12/1980 | Clain et al. | 224/42.23 |

FOREIGN PATENT DOCUMENTS 784718 10/1957 United Kingdom ............. 224/42.23

Primary Examiner—Linda J. Sholl
Attorney, Agent, or Firm—Kimmel, Crowell & Weaver

[57] ABSTRACT

A spare tire and wheel support and holding structure for attachment to the undersurface of a conventional type trailer structure. A mounting frame for attachment to the trailer has a pair of depending plates, with the free ends of said plates being provided with apertures therethrough near the free ends thereof. A tire and wheel support fixture comprising a frame of U-shaped configuration is sized so that the open ends of said U can pass through the respective apertures at the ends of the depending plates. Quick release pins then retain said U-shaped support frame in pivotal relationship with the mounting frame, the other end of the U-shaped support fixture having hooks thereon for association with a T-bar which is adjustably mounted at the end of a rod pivotally affixed to quick release structure for mounting on another portion of the trailer structure. The quick release mounting has a pair of pivotal L-shaped plates, a pair of mounting brackets for supporting same, a slide plate, together with a compression spring, associated pivot elements and a handlebar for quickly, easily and positively latching the free end of said support fixture in spare tire holding position with the trailer.

11 Claims, 3 Drawing Sheets

TRAILER TIRE RACK

This is a continuation of application Ser. No. 094,585 filed Sept. 9, 1987, abandoned.

BACKGROUND OF THE INVENTION

1. Field of the Invention

This invention relates generally to devices for holding a spare tire and wheel with a trailer vehicle type structure.

2. Description of the Prior Art

A common problem with known spare tire holders is that they are not readily usable with utility-type trailer structures. Another problem is that most of the known type spare tire holding structure cannot be easily and completely disengaged from the associated trailer structure, nor do they provide easy means for positively latching and holding a spare wheel with such trailer structure.

Existing prior patents which may be pertinent to the present invention are as follows:
2,449,544—9/21/48—Ballard
2,631,764—3/17/53—Brown
3,862,696—1/28/75—McCauley, et al.
4,047,629—9/13/77—Klein
4,174,797—11/20/79—Yasue, et al.

Each of the above patents relates to a pivoted tire rack for association with a wheeled vehicle. Both U.S. Pat. Nos. 4,174,797 and 4,047,629 disclose pivoted spare tire racks which are affixed to vehicle bodies, and the respective racks include structure for holding the spare so that it will not shift on the support rack.

However, none of the known prior art devices offer the new and novel features of the present invention.

SUMMARY OF THE INVENTION

An object of the present invention is to provide a spare tire holding structure for use with wheeled vehicles, and especially towed trailer structures.

Another object of the present invention is to provide an easily installed mechanism for positively yet securely holding a spare wheel with a trailer body, and yet permit easy opening and removal of the spare wheel when needed.

A further object of this invention is to provide a tire holding rack provided with a U-shaped support frame and centering structure for the wheel in the middle thereof, together with pivot structure at one end for the open portion of the U-shaped frame and quick release latching mechanism for the other end thereof.

A still further object of the present invention is to provide a trailer tire rack having quick release mechanism associated with a wheel holding fixture, with the quick release mechanism having over-center locking mechanism for positively retaining the latched position thereof until an operator or user desires to open same.

The present invention has a number of new and novel features. Among them is the mounting frame which can be permanently affixed by welding or the like to the undersurface of a trailer tow bar unit, with this frame having a pair of elongated depending plates, with each plate having an aperture near the free end thereof. The respective apertures receive the free ends of a wheel holding U-shaped support fixture or structure and quick release pins associated with the support fixture ends retain same with the depending support plates. Midway of the support fixture is a central wheel locating, retaining and strengthening channel permanently affixed to the support fixture. The closed end of the U-shaped support fixture is provided with a pair of hooks on the outer surface thereof for engagement and retention of a T-bar adjustably mounted at the end of a pivoted latch rod. The pivot end of the latch rod is mounted between a pair of L-shaped retention plates which are pivotally supported between a pair of support brackets. A latch plate is slidably mounted between said pair of L-shaped plates and has an associated locking bar and compression spring at one end thereof. A pivot pin for supporting the upper pivot end of the latch rod is mounted between the L-shaped plates, and an operator's handlebar is also provided therewith. This mechanism allows for quick and positive locking of a spare wheel and tire to the underside of the supporting trailer structure, and yet permits very quick and easy unlocking and unlatching of same.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 4:
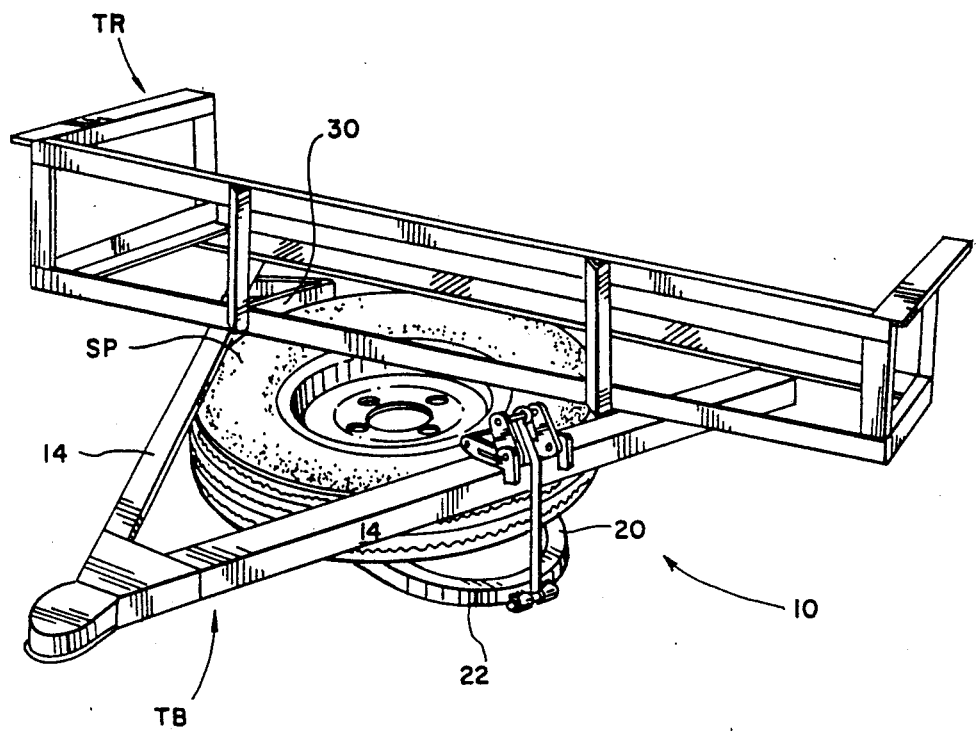
FIG. 4 is a perspective view of the device as mounted on the front tow bar structure of a trailer.

Referring to FIG. 4 of the drawings, reference numeral 10 indicates in general the device of the present invention as mounted with a tow bar structure of a trailer type vehicle. This vehicle has wheels for movement thereof (not shown), and for convenience and safety reasons, it is very desirable that a spare tire and wheel be readily accessible in case of a flat on one of the main support/operating wheels. Such a spare SP is shown as mounted and held in position by the structure of the present invention.

Looking primarily at FIGS. 1 and 4, the overall basic structure will be described in detail. A U-shaped tire rack 19 has parallel legs 20 joined at one end thereof by the closed portion 22 of the "U" and having upturned free ends 24 at the other end. The closed portion 22 is provided with a pair of hooks 23 for use with the latch rod 40. Each respective open end 24 is provided with a hole 26 therethrough for reception of a retention pin a sliding latch. Approximately midway of the U-shaped support fixture is a rigid strengthening channel 28 which is welded at the respective ends thereof to the upper surfaces of legs 20. Indentations 128 at the curved portions of the strengthening channel provide additional rigidity and strength thereto. This structure 28 also provides a centering and holding means with the inner open area of the spare wheel for preventing same from sliding.

A mounting frame 29 having a pair of converging legs 30 provides a mounting which can be affixed by welding or the like to the inner and underneath portion of a trailer tow bar TB. One of the legs 30 has a pair of depending plates 32 extending therefrom, with each plate 32 being provided with a large square opening 34 for reception of the respective angled ends 24 of the U-shaped tire support fixture. As can be easily visualized by looking at FIG. 1, after the ends 24 have been passed through openings 34, the retention pins 126 can be inserted through apertures 26, which will suitably retain the support fixture with the mounting frame. Of course, because of the looseness between the openings 34 and the fixture ends 24, a pivotal mounting of the support fixture is provided by this connection.

Looking at FIGS. 1, 5 and 6, the latching and lock mechanism will now be described. A latch rod 40 has the free end thereof threaded T for adjustably receiving a T-bar 42 thereon. This T-bar 42 is sized to easily fit within the hooks 23 of the tire support fixture. The other end of rod 40 is provided with an angled end 41 terminating in a closed eye 43. The angled end 41 permits the proper operation of the latching mechanism without the main rod 40 binding or hitting the trailer tow bar TB.

Figure 2:
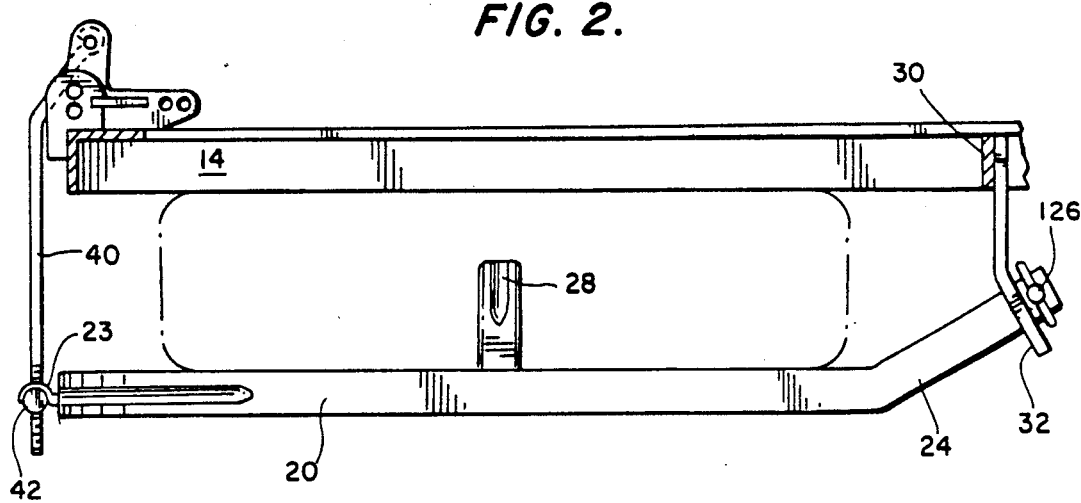
FIG. 2 is a side elevational view showing the device in the closed spare wheel holding position.
Figure 3:
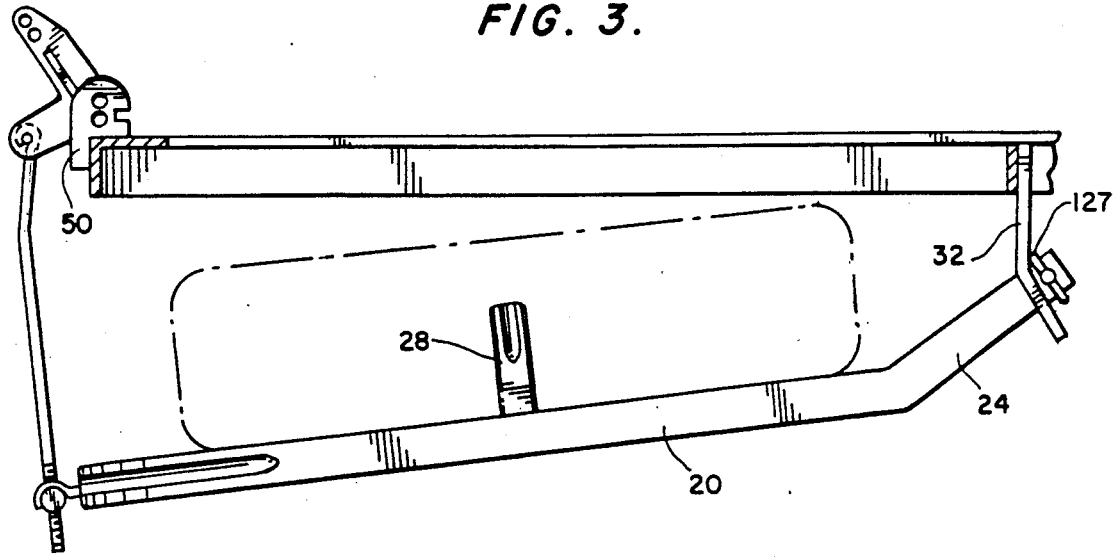
FIG. 3 is a side elevational view with the device in the open, unlatched and unlocked position.

A pair of L-shaped pivot plates 70 are arranged for mounting on either side of the rod end 41 and in turn are pivotally supported from brackets 50. Each bracket 50 has an aperture 51 for reception of a rivet R for pivotally mounting the respective L-shaped plate 70 therewith. A recessed shoulder portion 52 permits the respective brackets to be mounted on the opposite side of the tow bar 14 from that of mounting frame 30, and is appropriately welded thereto. Recessed slots 54 permit the open side of a sliding latch plate 60 to be received therein. A pivot pin PP is appropriately passed through holes 73 in the legs 72 of the L-shaped pivot plates. This pin PP supports the eye 43 of latch rod 40. The latch plate 60 has suitable ends 65 which extend through the respective slots 75 of the L-shaped plates 70, and when in the latched position shown in FIGS. 2, 5 and 6, the ends 65 engage in notches 54, preventing opening movement of the latch. A locking bar 62 with a central aperture 63 and ends 64 is mounted in apertures 74 of the plates 70, and once the latch mechanism is assembled, is securely held therewith. A compression spring CS is provided over a projecting extension 61 from plate 60 to hold the latch plate in its latched position. Extension 61 in turn slides through the aperture 63 of the locking bar 62.

Figure 1:
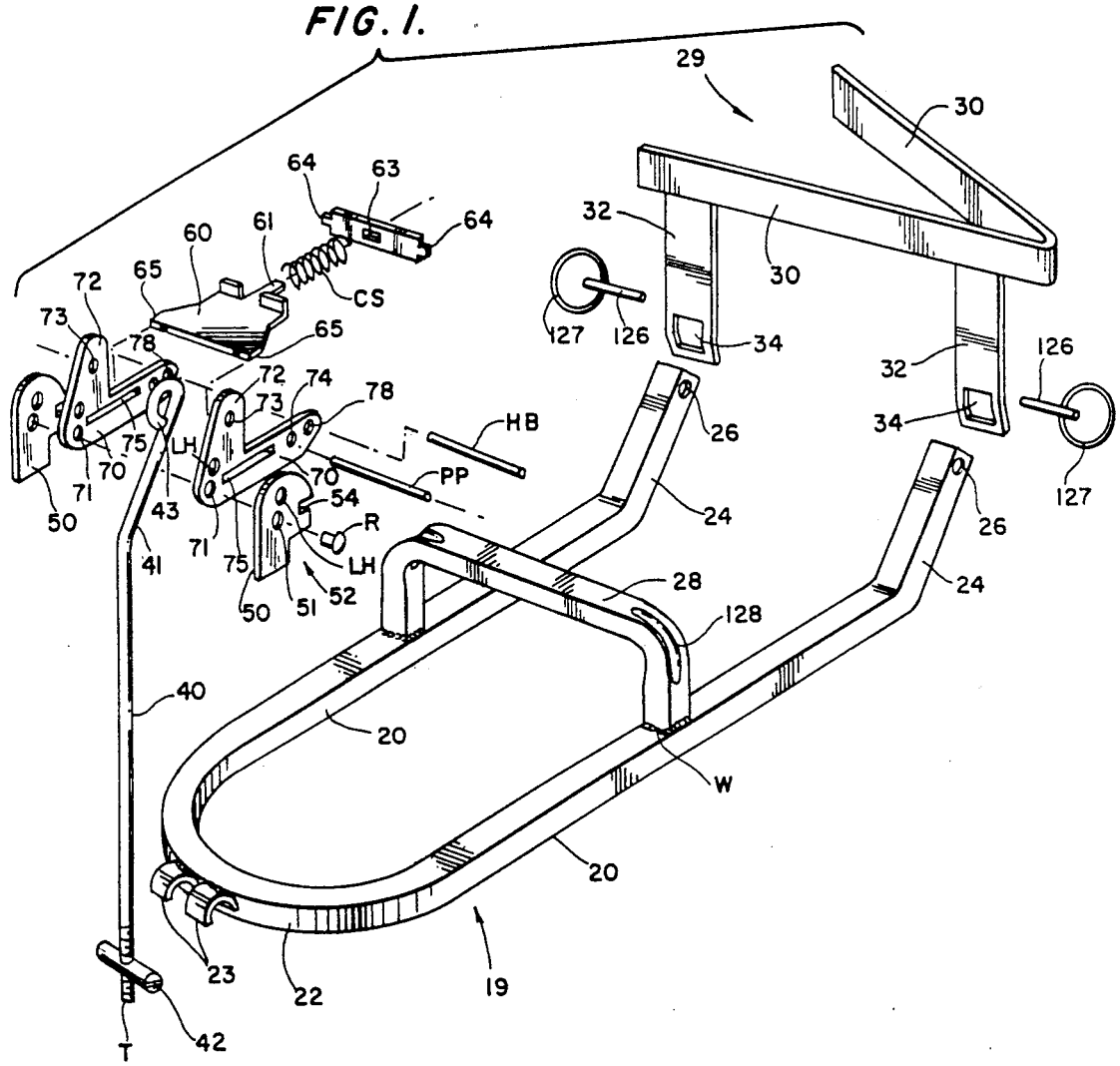
FIG. 1 is a perspective view of the present invention.
Figure 5:
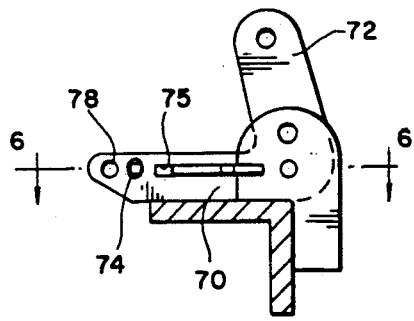
FIG. 5 is a view looking from the left of FIG. 4 of the latch and locking mechanism per se.
Figure 6:
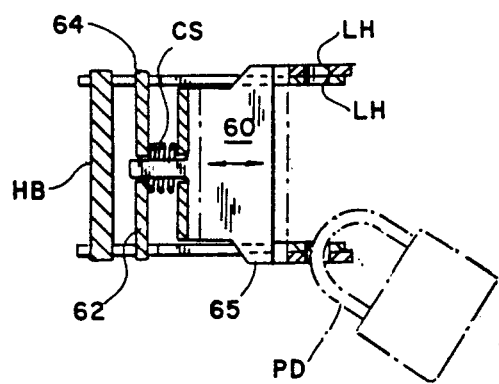
FIG. 6 is a plan view taken generally along line 6—6 of FIG. 5, and showing how a padlock may be used to secure the structure.

The exploded device of FIG. 1 is shown assembled in the views of FIGS. 5 and 6. An operator's handlebar HB is appropriately secured and affixed in the end holes 78 of the latch plates 70. Thus, as can be easily visualized, when an operator grasps the handlebar HB with the device locked as shown in FIGS. 4 and 5, and moves plate 60 against the bias of spring 65 to disengage ends 65 from notches 54, and then lifts and rotates the latch plates 70, the latch rod 40 will be lowered to such a position that the T-bar 42 can be disengaged from hooks 23 of the support fixture.

However, in the locked position of FIGS. 5 and 6, the over-center structure together with the latch plate 60 and compression spring CS provide safe locking and latching of this structure. Furthermore, if it is desired to positively prevent the mechanism from being unlatched and unlocked, a padlock PD may be inserted through one or the other, or both, pairs of lock holes LH, as depicted in FIG. 6.

This spare tire and wheel support and holding mechanism is easily attached to the tow bar structure of conventional type trailers, and provides a secure, theft-proof structure for holding and containing the spare wheel. It is relatively inexpensive to make and install, and yet very efficient in overall operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer tire rack, comprising:
    a mounting frame for attachment tot he towing structure of a trailer;
    a support fixture for holding a spare tire thereon;
    means on said support fixture for holding the spare tire in a center position;
    a pair of depending plates on said mounting frame for pivotally holding one end of said support fixture, each having an aperture provided near the end thereof for reception of a portion of said support fixture therethrough;
    said support fixture comprising a U-shaped elongated frame with the respective free ends of said U-shaped frame being sized to fit through the respective apertures of the depending plates, and two quick-release pins affixed to said free ends to retain said support fixture in pivotally assembled relationship with said depending plates; and
    quick release means for the other end of said support fixture to securely and positively hold said support fixture in a safe, locked manner in relation to said trailer towing structure.

2. The trailer tire rack of claim 1, wherein said support fixture near the closed other end of the U-shaped frame is provided with hook structure, and quick release means connects to said hook structure for latching and holding said other end of said pivotal frame.

3. The trailer tire rack of claim 2, wherein said quick release means for the other end of said support fixture frame includes an over-center pivot mechanism for positively latching said means in a locked position.

4. The trailer tire rack of claim 3, wherein said over-center pivot mechanism includes a pair of L-shaped plates, together with a pair of supporting brackets, and pivot rivets being provided between the respective pairs.

5. The trailer tire rack of claim 4, together with a slide plate mounted between said L-shaped plates in slots provided therewith, and a compression spring adjacent thereto.

6. The trailer tire rack of claim 5, wherein locking holes are provided between at least one of said L-shaped plates and at least one of said support brackets for receiving a padlock therethrough when desired.

7. The trailer tire rack of claim 1, wherein said support fixture near the closed end of the U-shaped frame is provided with hooks, and quick release means is associated with said hooks for latching and holding the other end of said pivotal frame.

8. The trailer tire rack of claim 7, wherein a latch rod is used between said hooks and quick release means.

9. The trailer tire rack of claim 8, wherein said quick release means for the other end of said support fixture frame includes an over center pivot mechanism for positively latching said means in a locked position.

10. The trailer tire rack of claim 9, wherein said over-centered pivot mechanism includes a pair of L-shaped plates pivotally mounted to a respective pair of supporting brackets, and pivot elements being provided between the respective pairs.

11. The trailer tire rack of claim 10, together with means on said support fixture for holding the spare tire in a centered position.

* * * * *